United States Patent [19]

Matsumoto

[11] Patent Number: 4,757,457
[45] Date of Patent: Jul. 12, 1988

[54] NUMERICAL CONTROL METHOD AND APPARATUS WITH FEEDRATE DIFFERENCE

[75] Inventor: Michio Matsumoto, Numazu, Japan

[73] Assignee: Toshiba Kikai Kabushiki Kaisha, Tokyo, Japan

[21] Appl. No.: 813,658

[22] Filed: Dec. 26, 1985

[30] Foreign Application Priority Data

Dec. 27, 1984 [JP] Japan .................. 59-278743

[51] Int. Cl.⁴ .................................. G06F 15/46
[52] U.S. Cl. ................... 364/474; 364/167; 318/571
[58] Field of Search .......... 364/167, 474; 318/571, 318/474.31

[56] References Cited

U.S. PATENT DOCUMENTS

| | | | |
|---|---|---|---|
| Re. 30,132 | 10/1979 | Jrie | 318/571 X |
| 3,110,865 | 11/1963 | Scuitto | 318/571 |
| 3,876,873 | 4/1975 | Slawson | 364/167 X |
| 4,079,235 | 3/1978 | Froyd et al. | 318/571 X |
| 4,209,847 | 6/1980 | Noda et al. | 364/167 X |
| 4,408,280 | 10/1983 | Bedini et al. | 364/167 X |
| 4,519,026 | 5/1985 | Nozawa et al. | 364/188 X |

Primary Examiner—Jerry Smith
Assistant Examiner—Steve L. Hoang
Attorney, Agent, or Firm—Cushman, Darby & Cushman

[57] ABSTRACT

A numerical control apparatus having a feedrate difference reduction capability suitable for use with a multi-axis machine tool. Feedrate differences for respective control axes are calculated from a machining program, and decelerations for the respective control axes are calculated from preestablished allowable feedrate difference settings and the calculated feedrate differences. The control axes are controlled to be displaced within the allowable feedrate difference settings based on the calculated decelerations.

15 Claims, 20 Drawing Sheets

Fig.7B

| | | | |
|---|---|---|---|
| ΔT | SAMPLING PERIOD | | sec |
| Vn | PRESENT FEEDRATE | (COMBINED AXIS) | $\mu/\Delta T$ |
| Vp | COMMAND FEEDRATE | (COMBINED AXIS) | $\mu/\Delta T$ |
| V | TARGET FEEDRATE | (COMBINED AXIS) | $\mu/\Delta T$ |
| ΔV | ACCELERATION | (COMBINED AXIS) | $\mu/\Delta T^2$ GIVEN AS A PARAMETER |
| K | OVERRIDE | (COMBINED AXIS) | % |
| Ln | REMAINING DISTANCE | (COMBINED AXIS) | $\mu$ |
| ΔLn | DISTANCE TRAVELED BY COMBINED AXIS IN ΔT | | $\mu$ |
| RL | REMAINDER | (SMALLER THAN 1$\mu$) | |
| Rx | REMAINDER | | |
| Ry | REMAINDER | | |
| Rz | REMAINDER | | |

$$S \begin{pmatrix} \text{DECELERATING} \\ \text{DISTANCE} \end{pmatrix} = \frac{1}{2} V_n \cdot T$$

$$= \frac{1}{2} V_n \cdot \frac{V_n}{\Delta V}$$

$$= \frac{(V_n)^2}{2 \cdot \Delta V}$$

| PROGRAM BLOCK ON NC TAPE | ABSOLUTE FEEDRATE DIFFERENCE BETWEEN BLOCKS (X-AXIS) (mm/min) | COMMENTS |
|---|---|---|
| N1 X100.00 F4000 G1 | | G1: LINEAR INTERPOLATION COMMAND |
| | > 2000 | |
| N2 X50.00 F2000 | | |
| | > 1500 | |
| N3 X12.00 F500 | | |
| | > 2500 | |
| N4 X75.00 F3000 | | M2: END OF PROGRAM |
| | > 2000 | |
| N5 X25.00 F1000 | | |
| | > 3000 | Ni: BLOCK CODE |
| N6 X100.00 F4000 | | |
| | > 8000 | |
| N7 X-100.00 F4000 | | |
| | > 3000 | |
| N8 X-25.00 F1000 | | |
| | > 2000 | |
| N9 X-75.00 F3000 | | |
| | > 5000 | |
| N10 X50.00 F2000 | | |
| | > 1500 | |
| N11 X12.00 F500 | | |
| | > 1000 | |
| N12 X-12.00 F500 | | |
| | > 3500 | |
| N13 X-100.00 F4000 | | |
| M2 | | |

| PROGRAM BLOCK ON NC TAPE | ABSOLUTE FEEDRATE DIFFERENCE BETWEEN BLOCKS (X-AXIS) (mm/min) | ABSOLUTE FEEDRATE DIFFERENCE BETWEEN BLOCKS (Y-AXIS) (mm/min) | COMMENTS |
|---|---|---|---|
| N0G1F4000 | 4000 | 0 | G1: LINEAR INTERPOLATION COMMAND |
| N1X100.00 | 0 | 1000 | |
| N2X100.00Y25.00 | 0 | 1000 | F4000: FEEDRATE OF 4000mm/min FOR X-AXIS |
| N3X100.00 | 0 | 2000 | |
| N4X100.00Y50.00 | 0 | 2000 | Ni: BLOCK CODE |
| N5X100.00 | 0 | 3000 | |
| N6X100.00Y75.00 | 0 | 3000 | |
| N7X100.00 | 0 | 4000 | |
| N8X100.00Y100.00 | 0 | 2000 | |
| N9X100.00Y50.00 | 0 | 4000 | |
| N10X100.00Y-50.00 | 0 | 6000 | |
| N11X100.00Y100.00 | 0 | 8000 | |
| N12X100.00Y-100.00 | 0 | 4000 | |
| N13X100.00 | 4000 | 0 | M2: END OF PROGRAM |
| M2 | | | |

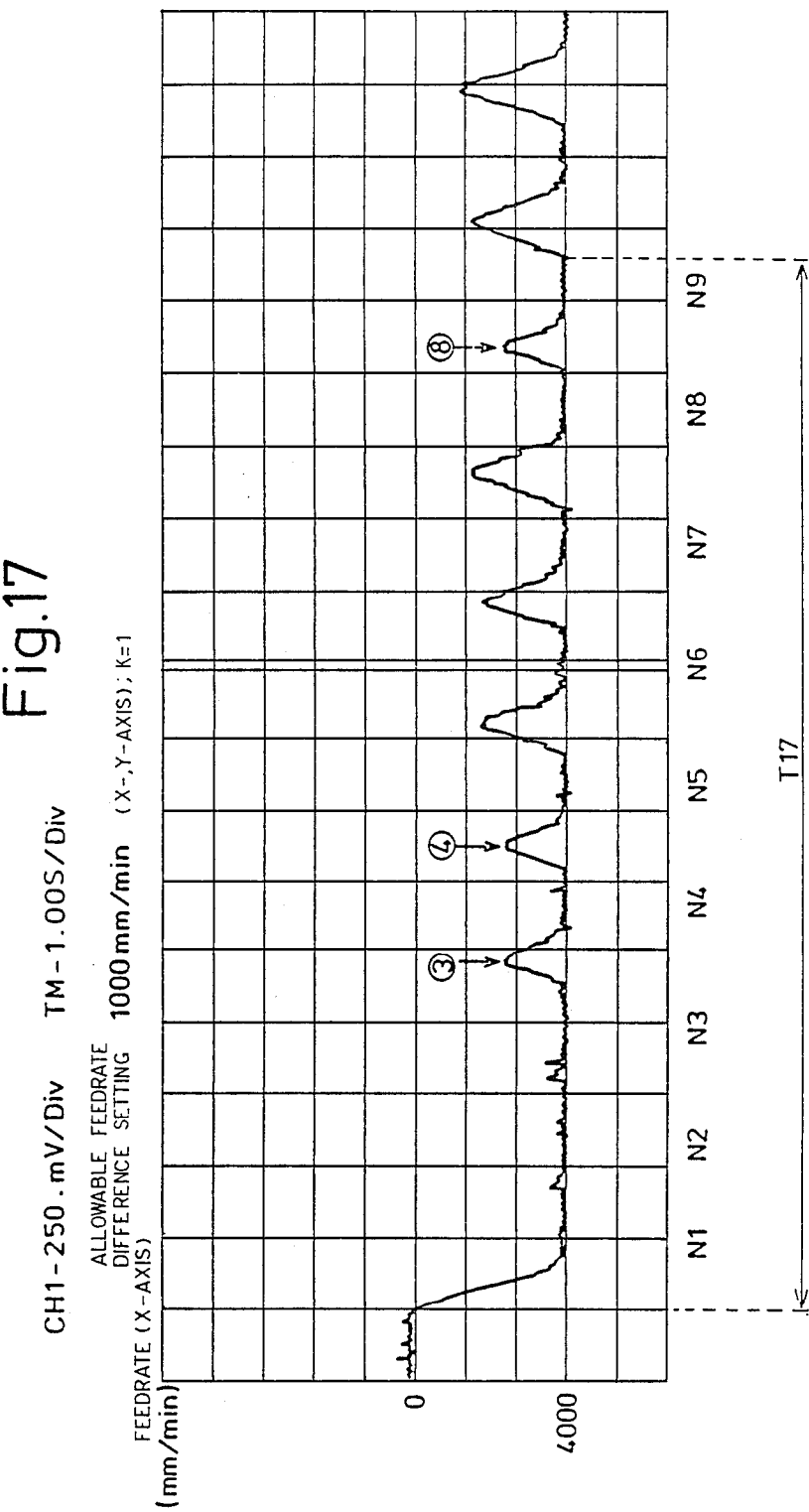

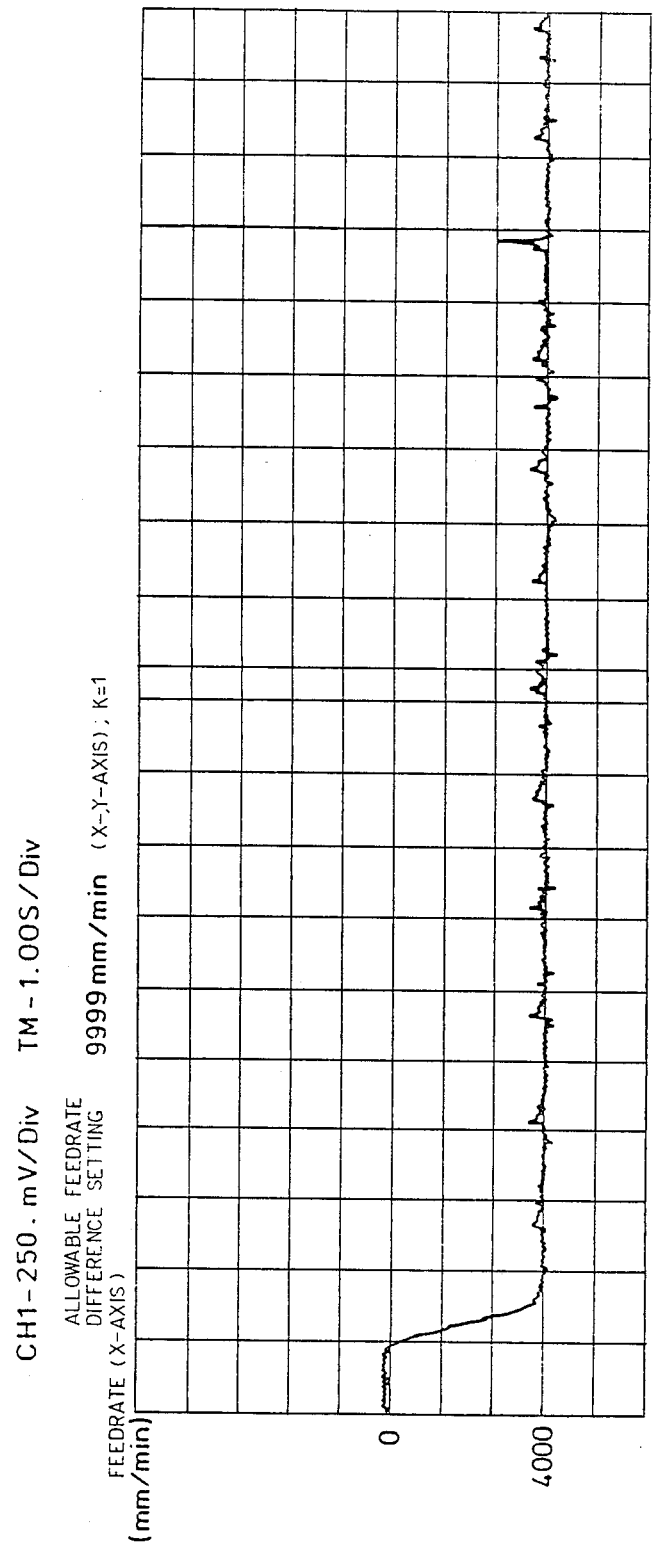

NUMERICAL CONTROL METHOD AND APPARATUS WITH FEEDRATE DIFFERENCE

BACKGROUND OF THE INVENTION

The present invention relates to numerical control method and apparatus for a machine tool or the like, and more particularly to numerical control method and apparatus with a capacity to reduce or smooth over the feedrate difference for each control axis in a machine tool or the like between adjacent blocks of a machining program.

Numerical control (NC) is widely used for controlling the path of movement of the cutting tools of machine tools under machining programs loaded in NC apparatus. The machining program is punched in an NC tape as movement commands or instructions in successive blocks. If each control axis in the machine tool is subjected to a large feedrate change or difference across the junction between one block and a next block when movement commands are executed, the servosystem and drive mechanism for the control axis undergoes a large mechanical shock.

Such a difficulty is particularly problematic with respect to multi-axis numerically controlled machine tools having more than three control axes since it is difficult to achieve quick identification of the control axis which is required to change its feedrate. More specifically, where the successive program blocks contain motion commands for moving the tool by small successive distances, the combined-axis feedrate of the tool is constant and smooth across block-to-block junctions. However, some axes may be subjected to quite a large feedrate change across a certain block-to-block junction.

FIG. 1 of the accompanying drawings illustrates the manner in which the tool undergoes such a feedrate change between adjacent program blocks. As shown in FIG. 1, a NC machining system includes a machine tool 10 and a bed 12 mounted on a foundation in juxtaposed relation. A slide table 14 is slidably mounted on the bed 12 for sliding movement in the direction of the arrow Z (Z-axis). On the table 14, there is rotatably supported a rotary table 16 rotatable in a horizontal plane in the direction of the arrow B by a rotating driver 16A. A workpiece W such as a propeller blade is fixed by an attachment 18 to the rotary table 16.

The machine tool 10 includes a column 22 slidably mounted on a bed 20 fixed to the foundation, the column 22 being slidable in the direction (X-axis) normal to the sheet of FIG. 1 by means of a drive source 20A including a drive motor. The column 22 supports on its front face a support base 26 carrying a spindle head 24 and slidable in the direction of the arrow Y (Y-axis) along slide surfaces 22A, 22B on the column 22. The support base 26 is driven by a feed screw 28 which can be rotated by an Y-axis motor 30 on the top of the column 22.

The spindle head 24 is mounted on the front face of the support base 26 and driven by a hydraulic cylinder 32 for angular movement about a pivot 34 in the direction of the arrow A. A head 38 is mounted on the left-hand end of the spindle head 24 and holds a tool 36 extending downwardly. The head 38 is angularly movable about the axis of the spindle head 24 in the direction of the arrow C through a certain angular range.

The NC machining system has six control axes, i.e., X-axis, Y-axis, Z-axis, and the three axes about which the angular movements A, B, C take place.

It is assumed that the tool 36 moves in the direction of the arrow ① while being held perpendicularly to the workpiece W in the same. If the feedrate F of the tip of the tool 36 is constant, the support base 26 has to be quickly moved in a negative direction along the Y-axis and the spindle head 24 has to be quickly moved in a negative direction along the axis of the angular movement A for the tool 36 to move around a workpiece corner CNR. This is an example in which some control axes are required to undergo large feedrate changes.

Such quick control axis feedrate changes in a complex curved surface machining cannot be predicted at the stage of preparing the machining program for the workpiece W with the aid of a computer (known as CAD/CAM). The only available measure at the CAD/CAM stage is to reduce the entire feedrate of the tool. This is however disadvantageous in that the overall machining time is increased. Another solution to the problem of large feedrate changes is to reduce the feedrate of each control axis to zero at each block-to-block junction. This proposal also has drawbacks in that the machining time required is long and the tool tends to leave a marking on the machined surface each time it stops at the end of a block, thus failing to finish the workpiece surface well.

For the reasons described above, it has been the present practice to effect interpolation between one block and a following block for feedrate accelaration and deceleration.

FIGS. 2A and 2B diagrammatically show the manner in which such acceleration and deceleration through interpolation are effected. FIGS. 3A and 3B diagrammatically show the manner in which no such acceleration and deceleration are not carried out.

In each of the examples of FIGS. 2A and 2B and FIGS. 3A and 3B, program blocks executed contain the following commands:

| G01 | G91 | X | x1 | F f | (EOB) |
|---|---|---|---|---|---|
|  |  | X | x2 |  | (EOB) |
|  |  | Y | y1 |  | (EOB) |
|  | M02 |  |  |  | (EOB) |

G01 represents linear interpolation command, G91 incremental input, and M02 end of program. Since no acceleration and deceleration are performed in FIG. 3A, the resultant feedrates for the X- and Y-axes are the same as originally commanded as shown. However, the actual path of travel of the tool is subject to an error due to a servomotor error as shown in FIG. 3B, the error being proportional to the feedrate F. The drive systems for the X- and Y-axes suffer large mechanical shocks because the commanded feedrates for the X- and Y-axes are required to change in abrupt fall and rise at a time $t_i+1$.

In the example of FIGS. 2A and 2B, however, acceleration and deceleration are effected by way of interpolation, with the result that any mechanical shocks imposed on the X-axis and Y-axis drive systems are reduced and hence the servomotor delay is also reduced. However, the interpolation process causes a delay corresponding to a time constant. More specifically, interpolation to effect acceleration for the Y-axis is started when interpolation to effect deceleration for the X-axis is started at a time $t_k$. As a consequence, there is a time interval (tk−tk+1) during which time the tool is driven simultaneously along the X- and Y-axes. This has led to a shortcoming in that the actual path of travel of the tool deviates from the correct path to be followed.

While the above process of FIGS. 2A and 2B is effective in lowering the mechanical shock impoved on the drive system for one or more control axes at a block-to-block junction in the machining program for a multi-axis machine tool, it fails to essentially solve the problem of reduced machining accuracy.

The inventor has found that a numerically controlled tool can be moved along a commanded path while minimizing mechanical shocks on the drive systems for control axes by establishing an allowable feedrate differenc setting in terms of a parameter for each control axis between adjacent program blocks, effecting no interpolation-dependent acceleration and deceleration if the feedrate change for each control axis between the blocks does not exceed the allowable feedrate difference setting, and effecting acceleration and deceleration by way of interpolation if the feedrate change is in excess of the allowable feedrate difference setting.

SUMMARY OF THE INVENTION

It is an object of the present invention to provide numerical control method and apparatus with a feedrate difference reduction capability for suppressing any feedrate change for each control axis between adjacent program blocks down to a certain level suitable for a multi-axis machine tool being numerically controlled, for controlling the tool to move by way of interpolation, and for accomplishing high-precision machining under any successive tool motion commands.

It is another object of the present invention to provide numerical control method and apparatus capable of uniformizing the accuracies of machined shapes at the junctions between blocks of a machining program for curved surface machining no matter how complex it may be, so that a leftover cut or an excessive cut can be kept within a certain amount, and servomotors and mechanical systems can be operated without overstraining under reduced mechanical shocks due to feedrate changes.

According to the present invention, there is provided a method for controlling a numerical control apparatus having a plurality of control axes to effect machining operation on a workpiece, under a machining program, the method including the steps of establishing an allowable feedrate difference setting for at least one selected control axis, calculating the feedrate difference for the selected control axis from command data in successive blocks in the machining program for the selected control axis, calculating a deceleration for the selected control axis from the allowable feedrate difference setting and the calculated feedrate difference, and holding the feedrate difference within the allowable feedrate difference setting at a block-to-block junction based on the calculated deceleration.

According to the present invention, there is also provided a numerical control apparatus for machining a workpiece under a machining program, including a device for establishing an allowable feedrate difference setting for a control axis of the numerical control apparatus, a device for calculating the feedrate difference for the control axis from command data in successive blocks in the machining program for the control axis, a device for calculating a deceleration for the control axis from the allowable feedrate difference setting and the calculated feedrate difference, and a device for calculating a point to start deceleration in a present block from the calculated deceleration, whereby the feedrate difference will be held within the allowable feedrate difference setting at a block-to-block junction based on the calculated deceleration.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7B is a table of various symbols used in the block diagram of FIG. 5 and the flowchart of FIG. 7A;

FIGS. 14 through 18 are diagrams illustrative of the correlationship between feedrates and time in another simulated experiment using the numerical control apparatus of the present invention.

DESCRIPTION OF THE PREFERRED EMBODIMENT

Figure 4:
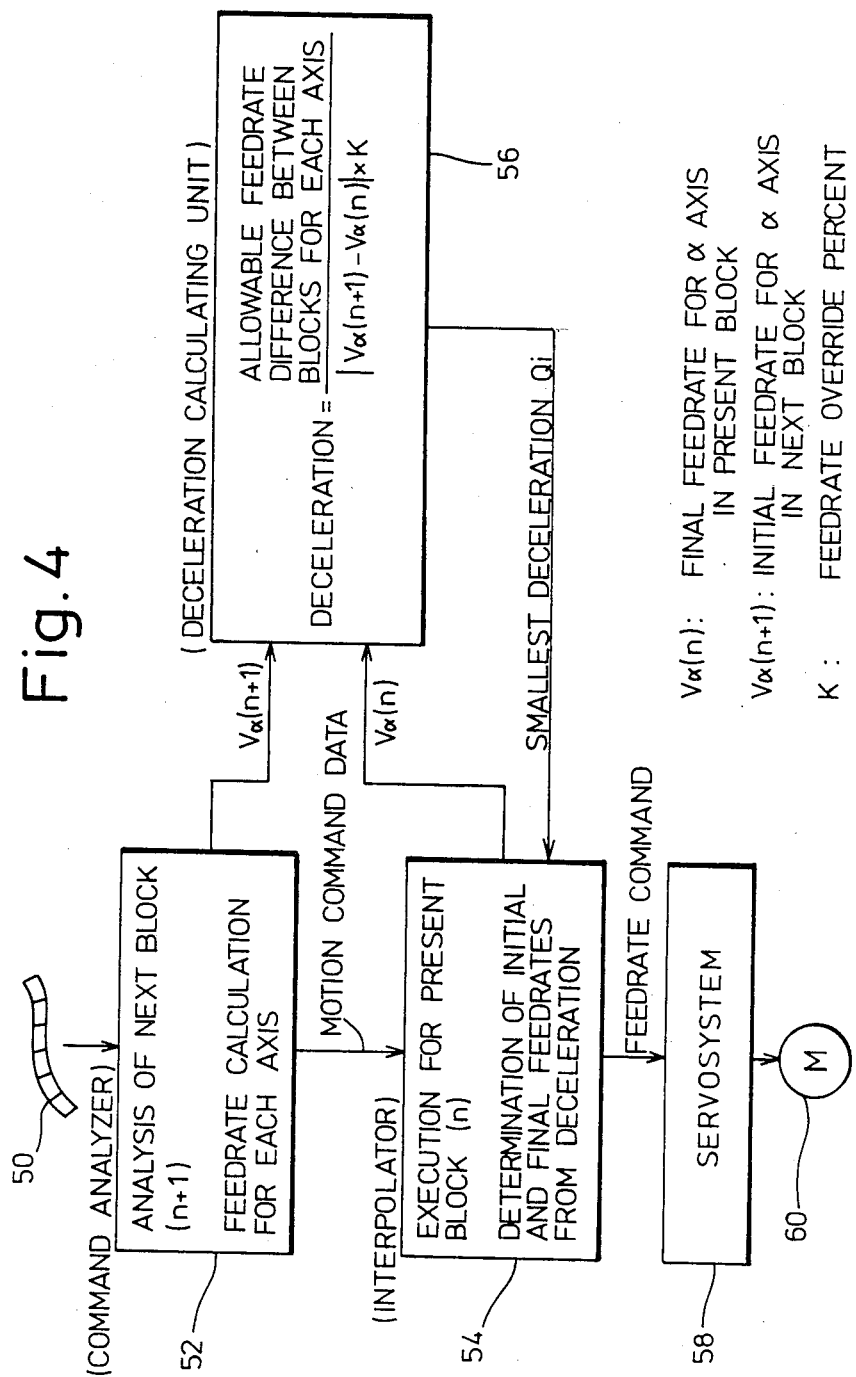
FIG. 4 is a flowchart showing the flow of signal processing in the nunerical control apparatus of the present invention.

FIG. 4 illustrates the flow of signal processing in a numerical control apparatus for carrying out a numerical control method of the present invention. A machining program is stored as successive blocks in a punched NC tape 50.

The numerical control apparatus includes a command analyzer 52 for analyzing command data in a next block, an interpolator 54 for effecting interpolation in a present block, a deceleration calculating unit 56, a servosystem 58, and a servomotor 60.

Assuming that a certain block in the NC tape contains command data X: x, Y: y, Z: z, ..., F: f, the command analyzer 52 effects the following operations:

(1) calculation of the distances x, y, z, ... traveled by control axes (the distances are the same as the commanded values on the NC tape in the incremental command system);

(2) calculation of the distance of the combined axis:

$$L = \sqrt{x^2 + y^2 + z^2, \ldots, + k^2} \ ;$$

(3) calculation of a reciprocal 1/L;
(4) conversion of the unit for the feedrate f; and
(5) calculation of the feedrates for the respective control axes:

$$(a \rightarrow x) Vx = f \cdot x/L$$
$$(a \rightarrow y) Vy = f \cdot y/L$$
$$\vdots$$
$$(a \rightarrow k) Vk = f \cdot k/L$$

The deceleration calculating unit 56 calculates the decelerations for the respective control axes between the present block and the next block based on the feedrate $V\alpha(n+1)$ calculated by the command analyzer 52 in each block for the control axes $\alpha(\alpha=x, y, \ldots, k)$, the present feedrate $V\alpha(n)$ with respect to the corresponding control axis for which interpolation is performed in the interpolator 54, and a predetermined allowable feedrate difference setting $VL\alpha$ for the control axes $\alpha$ between the blocks. The smallest of the calculated decelerations is referred to as Qi.

The interpolator 54 is responsive to the motion command from the command analyzer 52 to apply a feedrate command to the servosystem 58. At this time, the interpolator 54 calculates the feedrate for each control axis using the product of VnQi of the smallest deceleration Qi and the tool feedrate Vn as the tool feedrate.

The interpolator 54 also determines initial and final feedrates to be used in interpolation for acceleration and deceleration. The feedrate command from the interpolator 54 to each control axis is applied to the servosystem 58, which then supplies a commanded amount of electric energy to the servomotor 60 assigned to each control axis.

Figure 5:
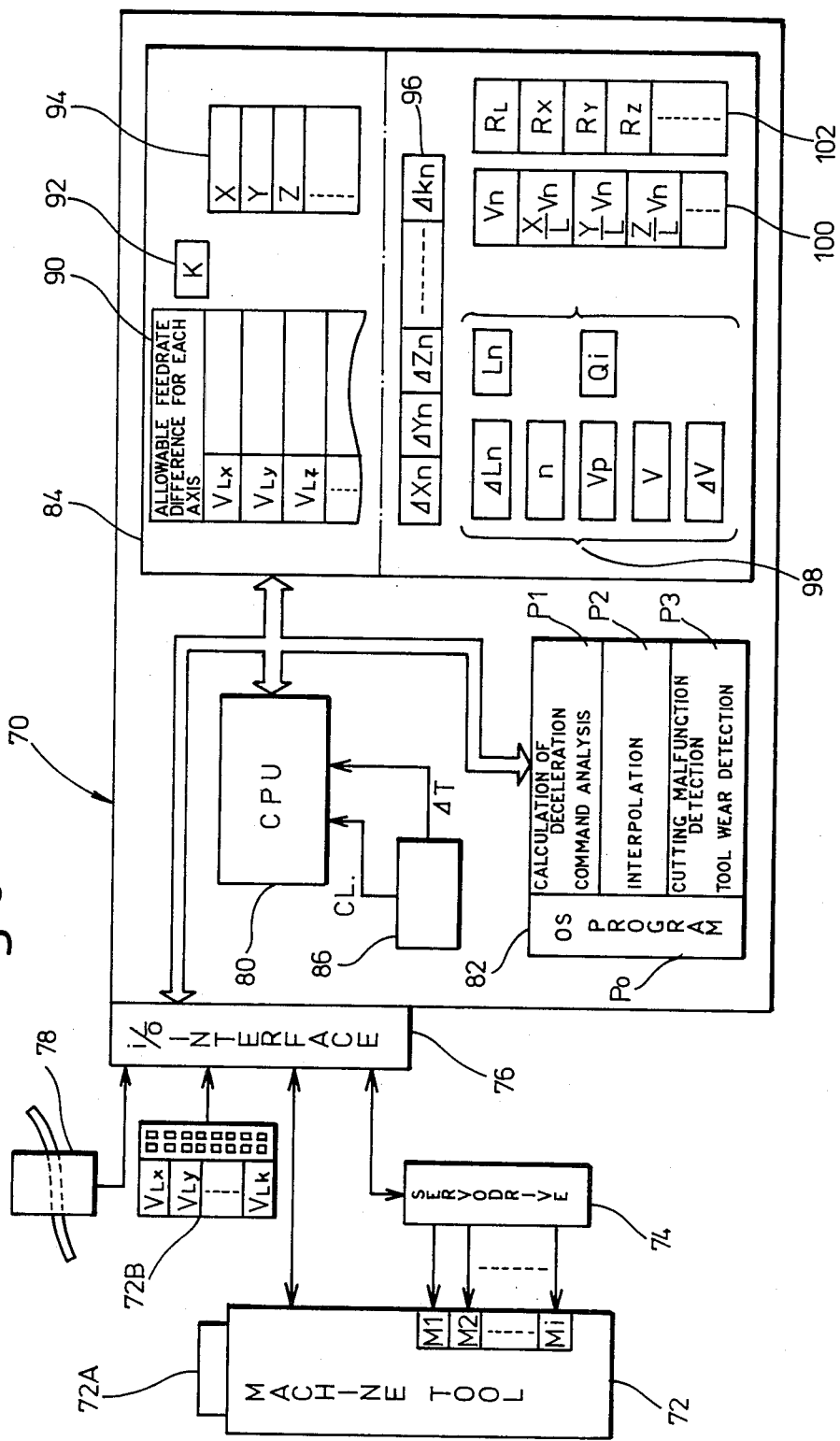
FIG. 5 is a block diagram of the numerical control apparatus of the present invention.

FIG. 5 shows in block form the functional elements of the numerical control apparatus which is generally denoted at 70 here. The numerical control apparatus 70 controls a machine tool 72 having an operator console 72A and servomotors M1, M2, ..., Mi corresponding to the respective control axes and supplied with electric energy from a servodrive unit 74. Signals can be transmitted between the numerical control apparatus 70 and the servodrive unit 74, the operator console 72A, and a tape reader 78 through an I/O interface 76. A parameter setting unit 72B is also connected through the I/O interface 76 to the numerical control apparatus 70. Although the parameter setting unit 72B is shown separate from the operator console 72A, it is actually installed on the operator console 72A.

In the illustrated embodiment, the numerical control apparatus 70 is of the CNC (Computer Numerical Control) type and generally includes a central processing unit (hereinafter referred to as a CPU) 80, a program memory 82, and a data memory 84. The numerical control apparatus 70 also has a reference signal generator 86 for generating a clock signal CL and a sampling signal having sampling periods each corresponding to a time $\Delta T$.

Figure 6:
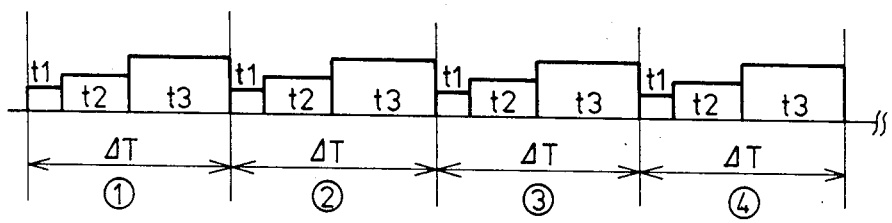
FIG. 6 is a diagram showing the correlationship between sampling periods and time zones in a CPU used in the numerical control apparatus.

As shown in FIG. 6, the operation of the CPU 80 is divided into the sampling periods $\Delta T$. Each of the sampling periods $\Delta T$ is composed of time zones t1, t2, and t3. In the first time zone t1, the CPU 80 issues an output to the servosystem 58, and in the second time zone t2, the CPU 80 performs an interpolation process by way of an interrupt. The CPU 80 analyses the command data in the next block in the time zone t3. Since analysis of the command data in the next block is not completed in one sampling period, the data of one block is processed over a few sampling periods. The deceleration is calculated in this time zone t3.

The data memory 84 has a memory area 90 for storing beforehand as parameters allowable feedrate difference settings $V_{LX}, V_{LY}, V_{LZ}, \ldots$ for the control axes x, y, z, ... of the machine tool 72. These parameters can be entered into the memory area 90 by identifying a desired control axis through the parameter setting unit 72B and entering the allowable feedrate difference setting for the desired control axis through a ten-key pad. The data memory 84 also has a memory area 92 for storing a feedrate overrid percent K, a memory area 94 for storing distance commands for the respective control axes in each block, and a memory area 96 for storing distances to be traveled in the respective sampling periods T. For example, the values $\Delta xn, \Delta yn, \Delta zn, \ldots$ obtained by the interpolation process in the time zone t2 in the sampling period (1) shown in FIG. 6 are supplied as servo outputs to the servodrive unit 74 in the time zone t1 in the next sampling period (1). The data memory 84 further includes memory areas 98, 100, 102 for storing various data items to be used in the operations effected by the interpolator 54. The various symbols used in the block diagram of FIG. 5 are explained in the table of FIG. 7B.

The program memory 82 of FIG. 5 stores an OS (Operating System) program Po as the system program for operating the numerical control apparatus. The program memory 82 also includes a memory area P1 for storing a command analysis program to process the data in the command analyzer 52 and a deceleration calculating program, a memory area P2 for storing an interpolation program for effecting the interpolation process in the interpolator 54, and a memory area P3 for storing a program to perform various functions of the machine tool, such as an application program for detecting cutting malfunctions and tool wears.

Figure 7A:
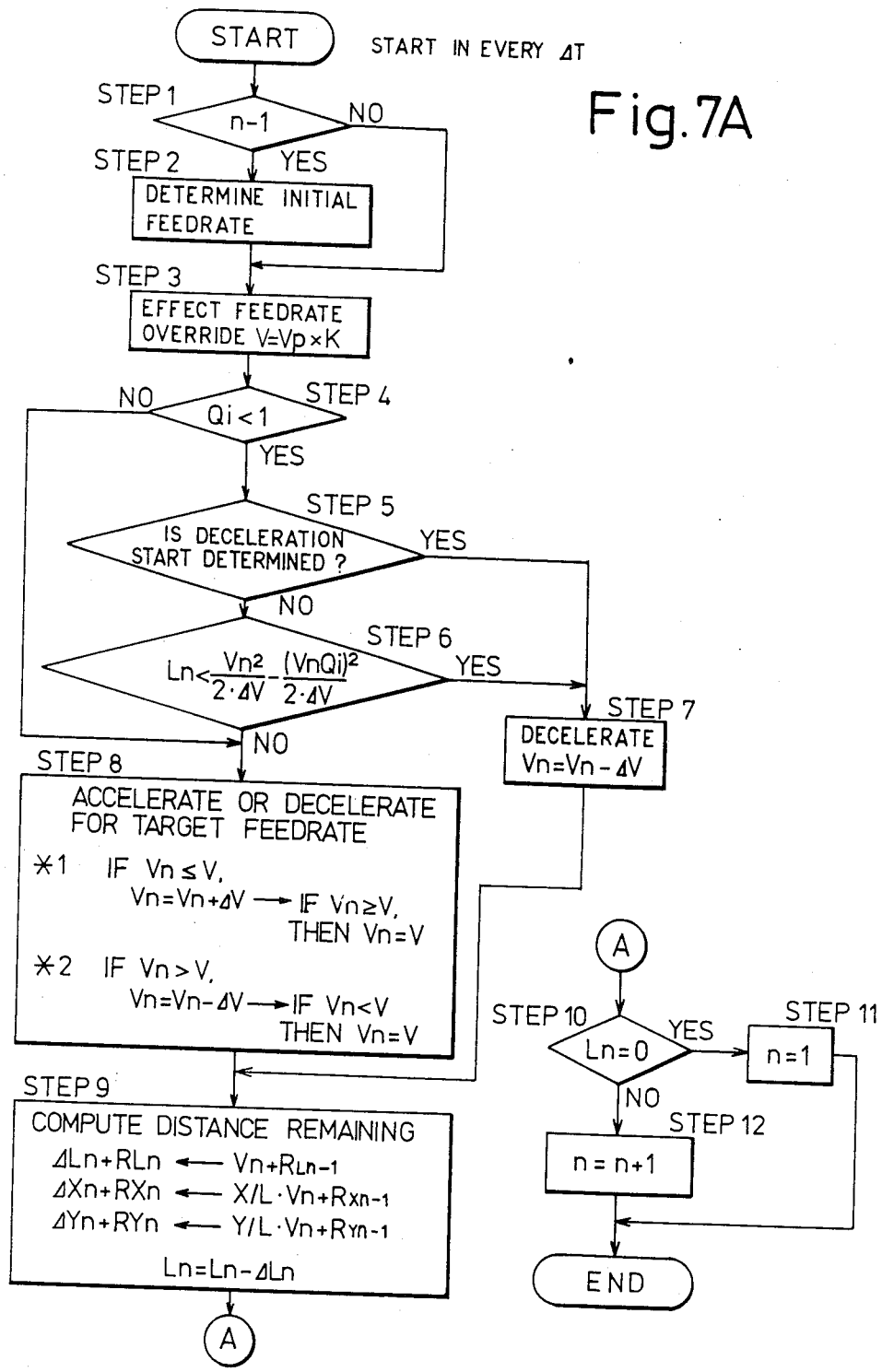
FIG. 7A is a flowchart of an interpolation process effected in each of the sampling periods.

FIG. 7A shows a flowchart of the interpolation process to be effected in each sampling period. When the time zone t2 in each sampling period is selected by an interrupt, the CPU 80 is operated by the interpolation program. A step 1 ascertains whether a calculated value n is 1 or not. The value n=1 corresponds to the starting of the interpolation process in each block. If n=1, then an initial feedrate Vl is determined in a step 2. An initial feedrate 0 or a commanded feedrate Vp is selected as the initial feedrate Vl at this time. When the tool has already been moved, Vl is normally not 0, and hence Vl is selected to be Vp. Then, a step 3 effects feedrate override to give an actual commanded feedrate as $V = Vp \times K$. If the smallest deceleration Qi from the deceleration calculating unit 56 is 1 or larger than 1 in a step 5, control jumps to a step 8. If not, then control proceeds to a step 5 which checks if the starting of deceleration is determined or not. If deceleration has already been started by the interpolation process, then the processing goes to a step 7 which reduces the present feedrate Vn at a rate equal to an acceleration $\Delta V$ in every sampling period.

If the starting of deceleration has not been started in the step 5, the processing goes to a step 6 to ascertain whether deceleration has been started or not. More specifically, the step 6 determines whether the remaining distance Ln in the present block being executed is smaller than:

$$V^2/(2\cdot\Delta V)-(VnQi)^2/2\cdot\Delta V=Lst$$

The value Lst will be described later on. If the remaining distance Ln is smaller than Lst in the step 6, then flow goes to the step 7 which effects deceleration in every sampling period. If Ln is not smaller than Lst in the step 6, then the processing goes to a step 7 for achieving a target feedrate. Specifically, if the deceleration Vn has not or has reached the target feedrate V, then $$Vn=Vn+\Delta V$$

and if $Vn \geq V$, then $$Vn=V$$

If the present feedrate Vn is higher than the target feedrate V, then $$Vn=Vn-\Delta V$$

and if $Vn < V$, then $$Vn=V$$

If a new Vn is instructed in the step 7 or the step 8, a step 9 calculates a remaining distance by adding the integrant and the remainder in the interpolation process for the combined axis and each control axis. For example, the addition of $Vn+RLn-1$ is carried out for the combined axis where $RLn-1$ is a value (fraction) smaller than 1 micron of the remainder (stored in a register) of the result of the preceding addition, RLn is a value smaller than 1 micron of the result of the present addition, and $\Delta Ln$ is the integer of the result of the addition.

The step 9 also updates the remaining distance Ln for the combined axis. As $\Delta Ln$ is given to the servosystem in the next sampling period, a step 10 ascertains whether the previous remaining distance Ln is 0 or not. If Ln is 0, then n=1 is set in a step 11 in preparation for checking if n=1 in the step 1 for the next block.

If there is still a remaining distance in the step 10, n is incremented by 1 in a step 12.

One cycle of the interpolation process is now completed.

Figure 7C:
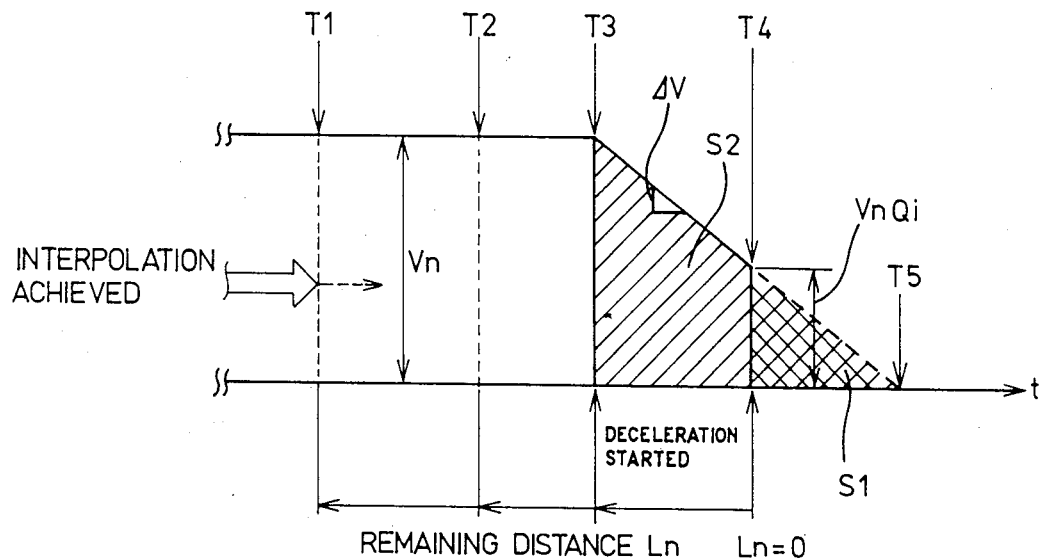
FIG. 7C is a diagram showing the correlationship between the remaining distance to be traveled by the tip of a tool and a time to start deceleration.

FIG. 7C is illustrative of the correlationship between the remaining distance Ln and a time T3 to start deceleration in the interpolation process for a certain block with respect to the direction in which the combined axis, i.e., the tip of the tool is moved. Since the condition (the step 6 in FIG. 7A) to start deceleration is not met by the remaining distance Ln at times T1, T2, the target feedrate V specified by the step 8 is selected to be Vn. When the condition of the step 6 is met at the time T3, deceleration is started. When Ln=0 at a time T4, the interpolation output in this block is stopped. It is to be noted here that the feedrate of the combined axis at the time T4 is VnQi. The value Qi (largest deceleration) at which the proportion of the feedrate difference for each control axis between this block and the next block has already been calculated before interpolation for this block was executed. The time T3 to start deceleration is calculated such that the present feedrate Vn starts at the time T3 to decrease by the prescribed acceleration $\Delta V$ in one interpolation process until Ln=0 when the feedrate reaches VnQi. The formula for carrying out this caculation is indicated in the step 6, and will be described below in more detail.

Figure 7D:
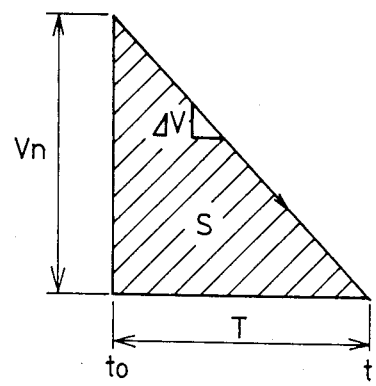
FIG. 7D is a diagram showing the correlationship between an interpolated feedrate output and time.

FIG. 7D shows the relationship between the distance S traveled and the time period T required until Vn= 0 when the present feedrate, i.e., the interpolated feedrate output Vn is reduced at the rate of the acceleration ($\Delta V/\Delta T$). The area of the shaded triangle in FIG. 7D represents the distance S traveled after the deceleration has started at to. The distance S is given by:

$$S=\tfrac{1}{2}\cdot Vn\cdot T=(Vn)^2/(2\cdot\Delta V)$$

The area S2 in FIG. 7C represents the distance traveled after the deceleration from Vn has started at the time T3 until a time T5 when the interpolated output is stopped, and the area S1 represents the distance in which VnQi is given as the interpolated output from the time T4 to the time T5. Therefore, $$S2 - S1 = (Vn)^2/(2\cdot\Delta V) - (VnQi)^2/(2\cdot\Delta V)$$

The CPU 80 always checks the time (to start the deceleration) when the remaining distance Ln becomes equal to (S2–S1) during the interpolation process.

If Qi is smaller than 1 in the step 4 of FIG. 7A, the processing jumps to the step 8 without effecting deceleration across the block-to-block junction since the feedrate difference falls within the allowable feedrate difference setting. The step 8 is a process of acceleration and deceleration without the step 7, i.e., with the starting of deceleration being not determined and with the answer of the decision step 6 being NO. The values $Vn+\Delta V$ at * 1 and $Vn-\Delta V$ at * 2 in the step 8 correspond, for example, to conditions in which K is varied by the operator.

Figure 8:
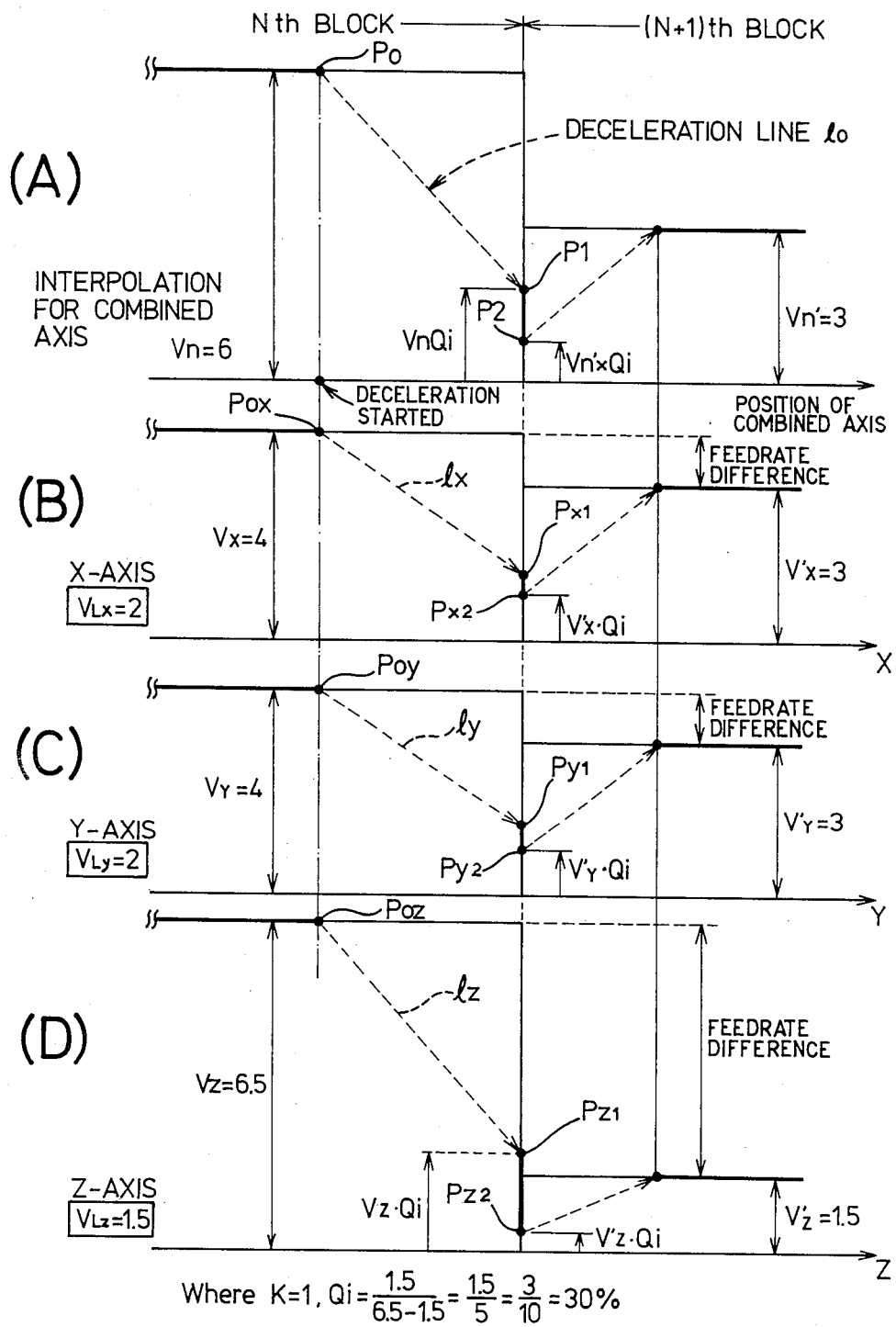
FIGS. 8(A)–8(D) are a diagram showing the correlationship between adjacent machining blocks and a feedrate difference.

FIG. 8 specifically shows how the feedrate for the combined axis and the feedrates for each control axis are influenced across a block-to-block junction when feedrate differences for the respective control axes x, y, z are $$|Vx-Vx'|=1$$

$$|Vy-Vy'|=1$$

$$|Vz-Vz'|=6$$

between the Nth block and the (N+1)th block, and when the allowable feedrate differences $V_{LX}$, $V_{LY}$, and $V_{LZ}$ for the respective control axes are 2, 2, and 1.5, respectively. As illustrated in FIG. 8 at (B), (C), and (D), the feedrate differences for the X- and Y-axes are smaller than the allowable feedrate differences $V_{LX}$, $V_{LY}$, and the feedrate difference for the Z-axis is $|Vz-Vz'|=5$ and hence exceeds $V_{LZ}$ (=1.5). Therefore, the present feedrate Vn for the combined axes is subjected to the deceleration process regardless of the magnitude of $|Vn-Vn'|$.

Therefore, the smallest deceleration Qi is given by:

$$\begin{aligned} Qi &= V_{LZ}/|Vz - Vz'| \times K \\ &= 1.5/(5 \times 1) \\ &= 0.3 \, (= 30\%) \, (K = 1). \end{aligned}$$

As shown in FIG. 8 at (A), the value VnQi is determined, and the position to start the deceleration for the combined axis is determined by the process described with respect to FIG. 7A from a deceleration line lo having a gradient ΔV. With the deceleration starting position indicated by Po in FIG. 8(A), points Pox, Poy, Poz corresponding to the point Po can be determined on the X-, Y-, and Z-axes, and feedrates are reduced along respective deceleration lines lx, ly, lz according to the interpolated outputs for the respective control axes. The block-to-block junction is indicated by a point P1 for the combined axis, and corresponding points for the respective control axes are denoted by Px1, Py1, Pz1, respectively. The feedrate for the next block (N+1) is indicated by a point P2 for the combined axis, and by points Px2, Py2, Pz2 for the respective control axes. The point P2 is given as Vn'Qi which is the product of a commanded feedrate Vn' for the next block for the combined axis and the deceleration Qi. Similarly, feedrates Vx'Qi, Vy'Qi, Vz'Qi for the points Px1, Py2, Pz2 for the X-, Y-, and Z-axes can be given. The value Vn=6 in FIG. 8(A) and the values Vx, Vy, Vz in FIG. 8(B), (C), (D) are indicated in different magnitudes. As seen from FIG. 8(D), $$|VzQi-Vz'Qi|=V_{LZ}$$

for the Z-axis, and the feedrate for the Z-axis is held to the allowable feedrate difference $V_{LZ}$ across the block-to-block junction according to the deceleration line lz and the specified points Pz1, Pz2.

Figure 1:
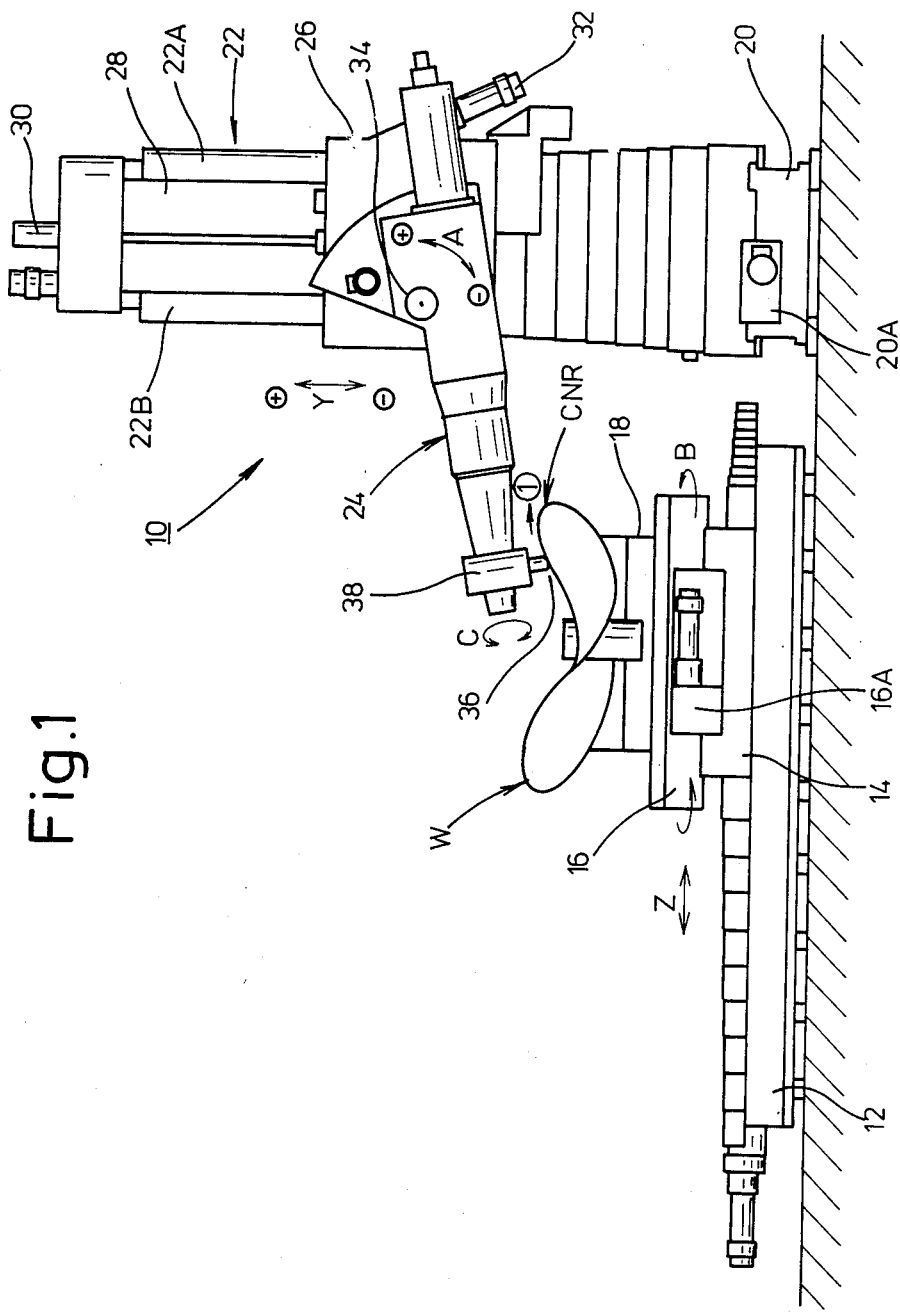
FIG. 1 is a front elevational view of a machining system controlled by a numerical control apparatus according to the present invention.
Figure 2A:
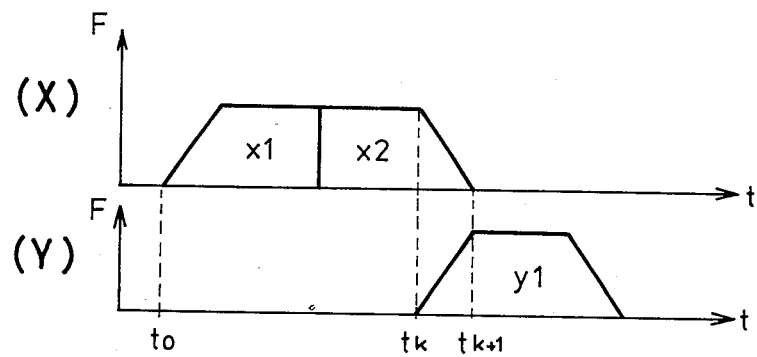
FIGS. 2A and 2B are diagrammatic views showing the manner in which acceleration and deceleration are effected by way of interpolation according to a conventional process.
Figure 2B:
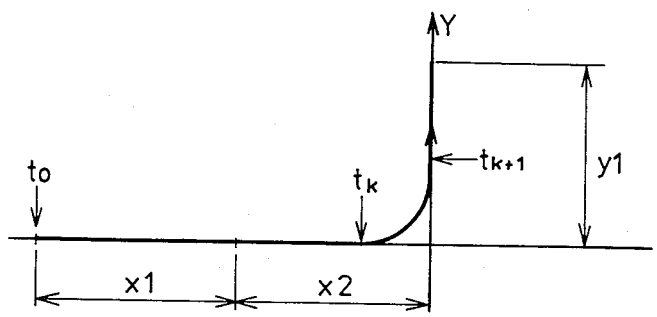
Figure 3A:
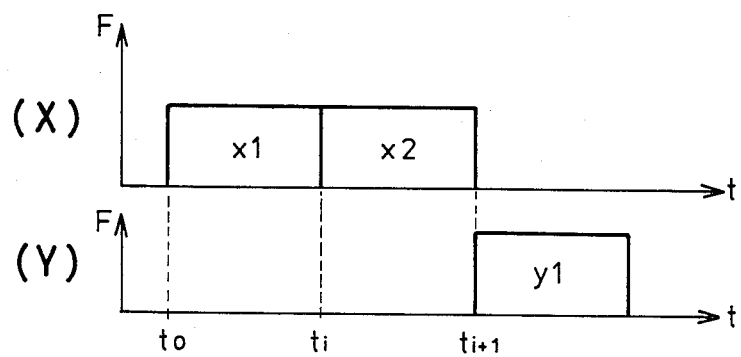
FIGS. 3A and 3B are diagrammatic views showing the manner in which no acceleration and deceleration are carried out.
Figure 3B:
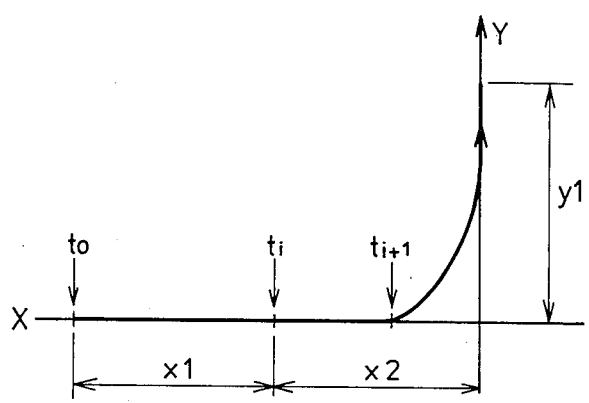
Figure 9A:
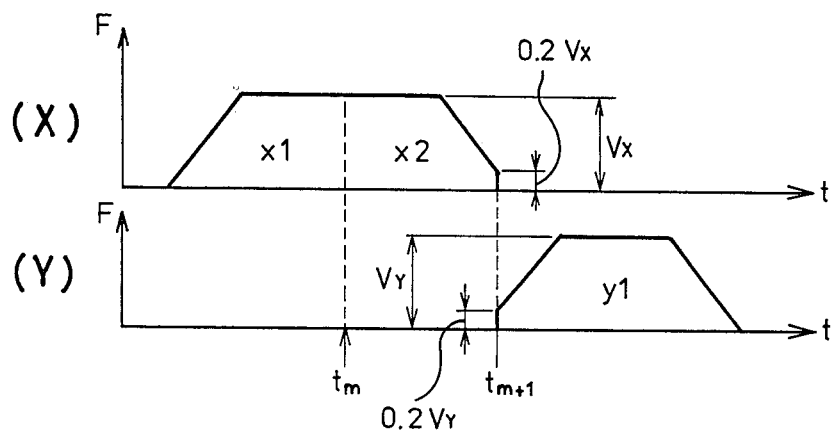
FIGS. 9A and 9B are diagrams showing the relationship between a processed feedrate output and a path of travel of the tool.
Figure 9B:
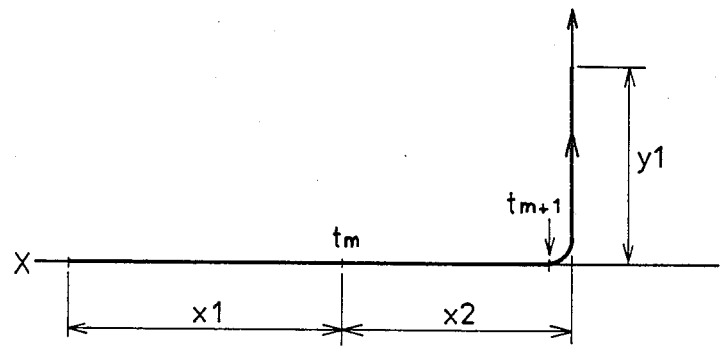

FIGS. 9A and 9B show processed feedrates and a path of movement of the tool according to the present invention. FIGS. 9A and 9B correspond to FIGS. 2A and 3B and FIGS. 3A and 3B. In FIG. 9A, the allowable feedrate differences for the X- and Y-axes are 20% of Vx, Vy, respectively. The processed feedrates are given as shown and interpolated output curves are not distorted. As shown in FIG. 9B, only the error present at the corner is a servo error proportional to a feedrate change in the final interpolated output between the blocks (x2 to y1). This error can greatly be reduced by reducing the parameter, i.e., the allowable feedrate difference (0.2Vx in this example).

Figure 10:
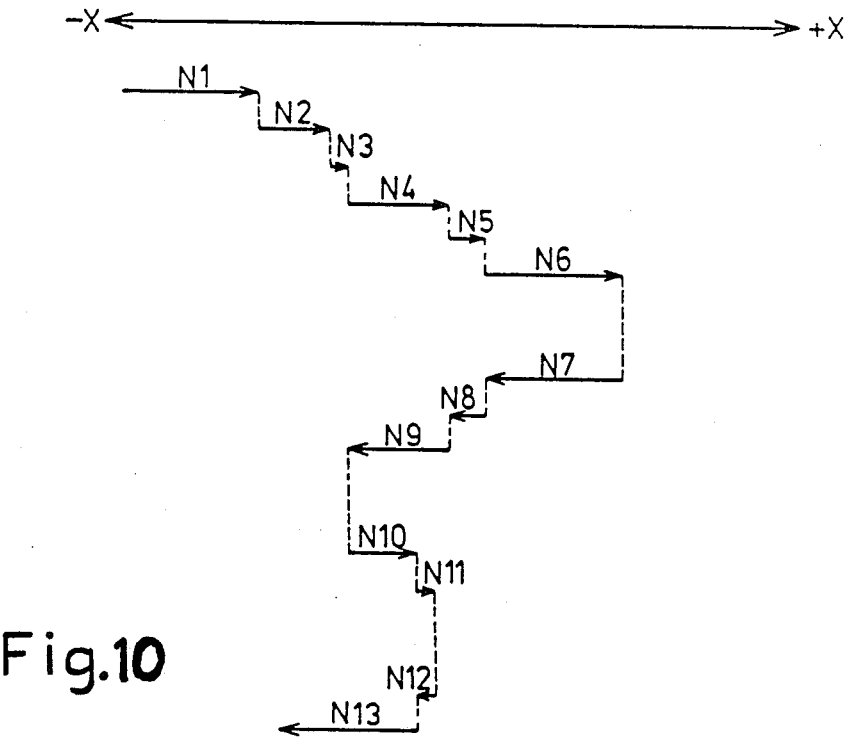
FIGS. 10 through 13 are diagrams illustrative of the correlationship between feedrates and time in a simulated experiment using the numerical control apparatus of the present invention.

FIGS. 10 through 13 show the results of a simulated experiment according to the present invention. FIG. 10 illustrates commands in respective blocks. In each of FIGS. 11 through 13, the X-axis is used as the control axis, and the current flowing through the X-axis driver motor is plotted for various allowable feedrate difference settings with respect to the X-axis, the current waveform corresponding to an X-axis feedrate waveform.

Figure 11:
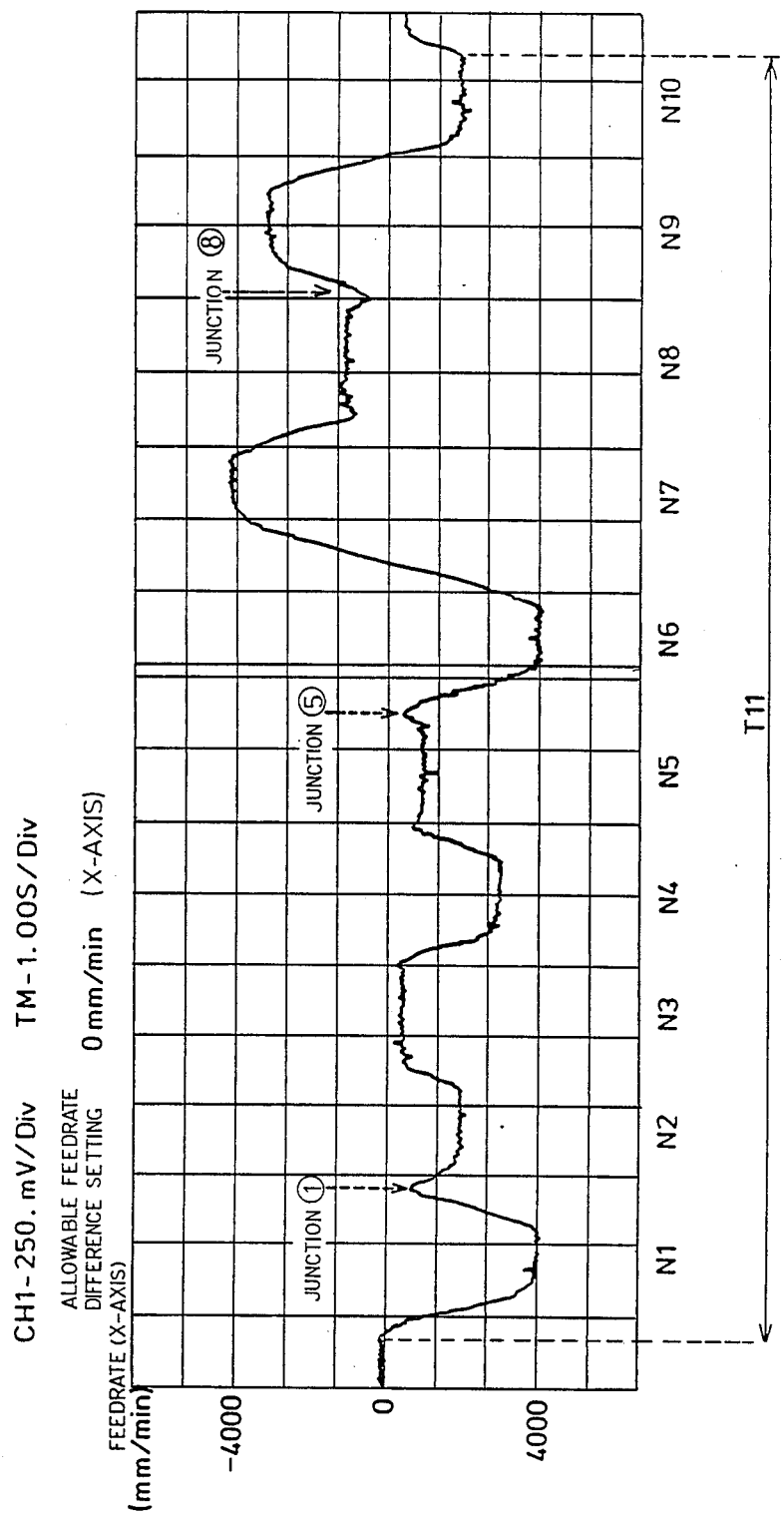

FIG. 11 shows block codes N1, N2, ..., N10 in the machining program. In FIG. 11, the allowable feedrate difference for the X-axis is selected to be 0 mm/min., meaning that when the feedrate difference at a block-to-block junction for the X-axis exceeds its allowable setting $V_{LX}$ (which is 0 here), the feedrate difference is reduced to the allowable setting, and hence the feedrate for the X-axis is reduced zero at the junction if there is any difference between command feedrates between blocks. As can be understood from FIGS. 10 and 11, the commanded distance in the positive direction along the X-axis is 100.00 mm and the feedrate F is 4000 mm/min. in the first block N1. The actual motor speed reaches about 4000 mm/min. In the block N2, the commanded distance is +50.00 mm and the feedrate F is 2000 mm/min. Thus, the absolute feedrate difference for the X-axis between the blocks N1 and N2 is $|2000-4000|=2000$. Since the absolute feedrate difference is larger than $V_{LX}(=0)$, the feedrate for the X-axis is reduced to zero at the junction ①. The actual waveform does not reach the zero level as the command in the next block N2 is applied to the motor before the feedrate falls to zero because of the response delay of the motor.

Likewise, there are feedrate differences at the junctions between the blocks N2, N3, ..., and the feedrate is controlled to fall to zero at each of the junctions. Although both of the commanded feedrates F in the blocks N6, N7 are 4000 in FIG. 10, the feedrate difference is $+4000-4000=8000$ because the signs of incremental distances along the X-axis are opposite to each other.

Figure 12:
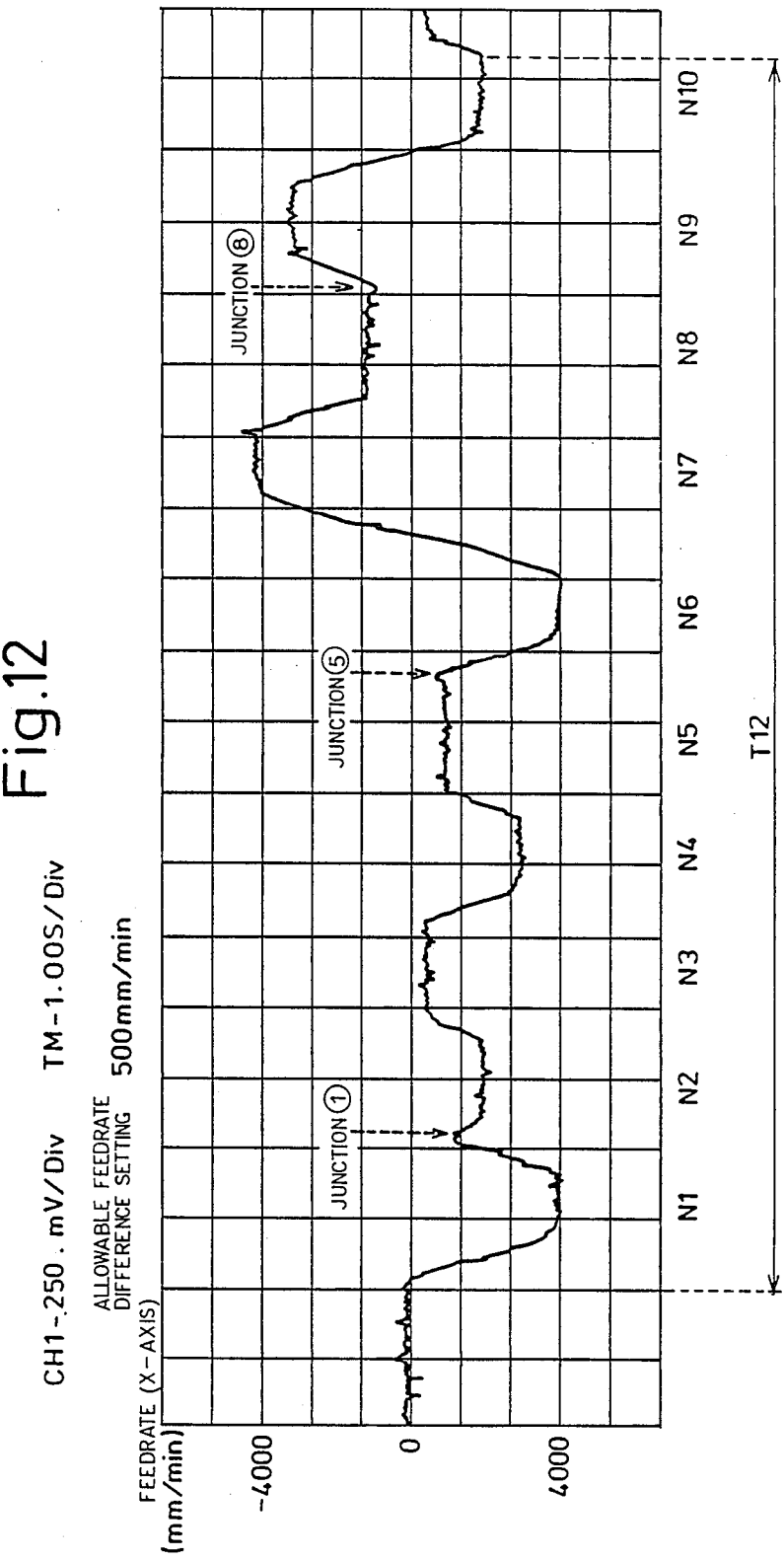

FIG. 12 shows a feedrate waveform plotted in response to the commands shown in FIG. 10, with the allowable feedrate difference setting being 500 mm/min. In FIG. 12, the commanded feedrate as interpolated does not fall to zero between adjacent blocks because of the allowable feedrate difference setting of 500 mm/min. Comparison of the feedrate waveforms of FIGS. 11 and 12 indicates that the feedrate is away from the zero level and varies more smoothly at the junctions ①, ⑤, and ⑧ in FIG. 12 than the feedrate of FIG. 11. Since the interpolated output does not reach the zero level at each block-to-block junction, the time required for the tool to move through the entire path is shorter, as confirmed by the relation of T12<T11 in FIGS. 11 and 12.

Figure 13:
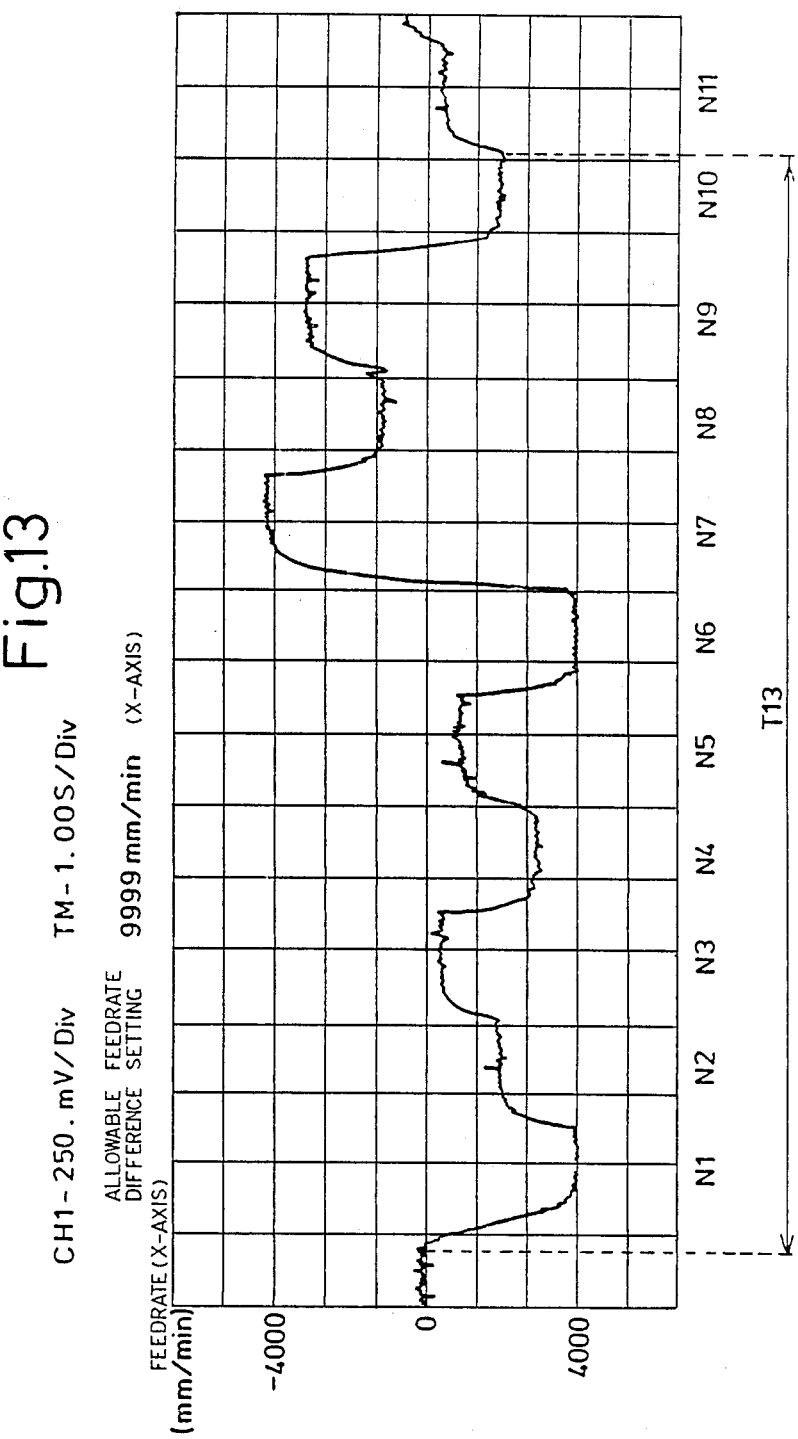

The feedrate waveform shown in FIG. 13 is plotted when the allowable feedrate difference setting is 9999 mm/min. Because the feedrate difference does not exceed 9999 mm/min. between adjacent ones of all blocks N1 through N13 shown in FIG. 10, the feedrate difference between the adjacent blocks is directly applied to the motor. The waveform of FIG. 13 at each block-to-block junction is therefore of an exponential curve. The time T13 required to run from the block N1 to the block N10 is shorter than the time T12. In FIG. 13, there is a feedrate change of 8000 mm/min. in about 0.5 second at the junction between the blocks N6 and N7. In FIGS. 11 and 12, such a feedrate change takes place in more than 1 second. Therefore, the feedrate waveform of FIG. 13 can reduce mechanical shocks imposed on the drive systems.

FIGS. 14 through 18 illustrate the results of another simulated experiment according to the present invention.

Figure 14:
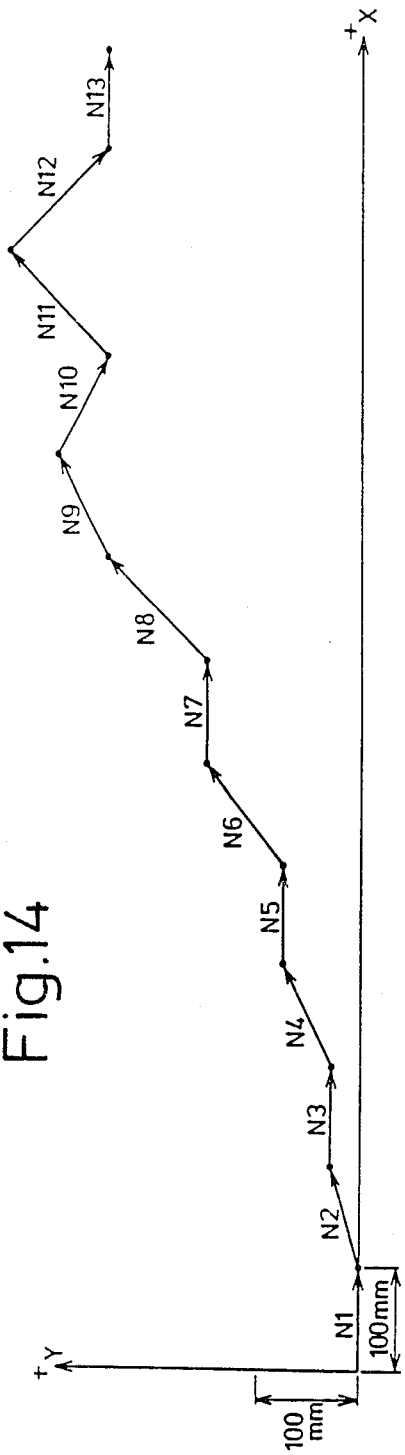

FIG. 14 shows in its upper part an X - Y coordinate system indicating commanded movement paths in respective blocks N1 through N13. FIG. 14 also shows in its lower part the commands in the respective blocks N0 through N13 for the X- and Y-axes and absolute feedrate differences between these blocks.

FIGS. 14 through 18 are employed to indicate that when any feedrate difference between blocks for the Y-axis exceeds an allowable feedrate difference $V_{LY}$, the commanded feedrate for the X-axis is influenced thereby.

Figure 15:
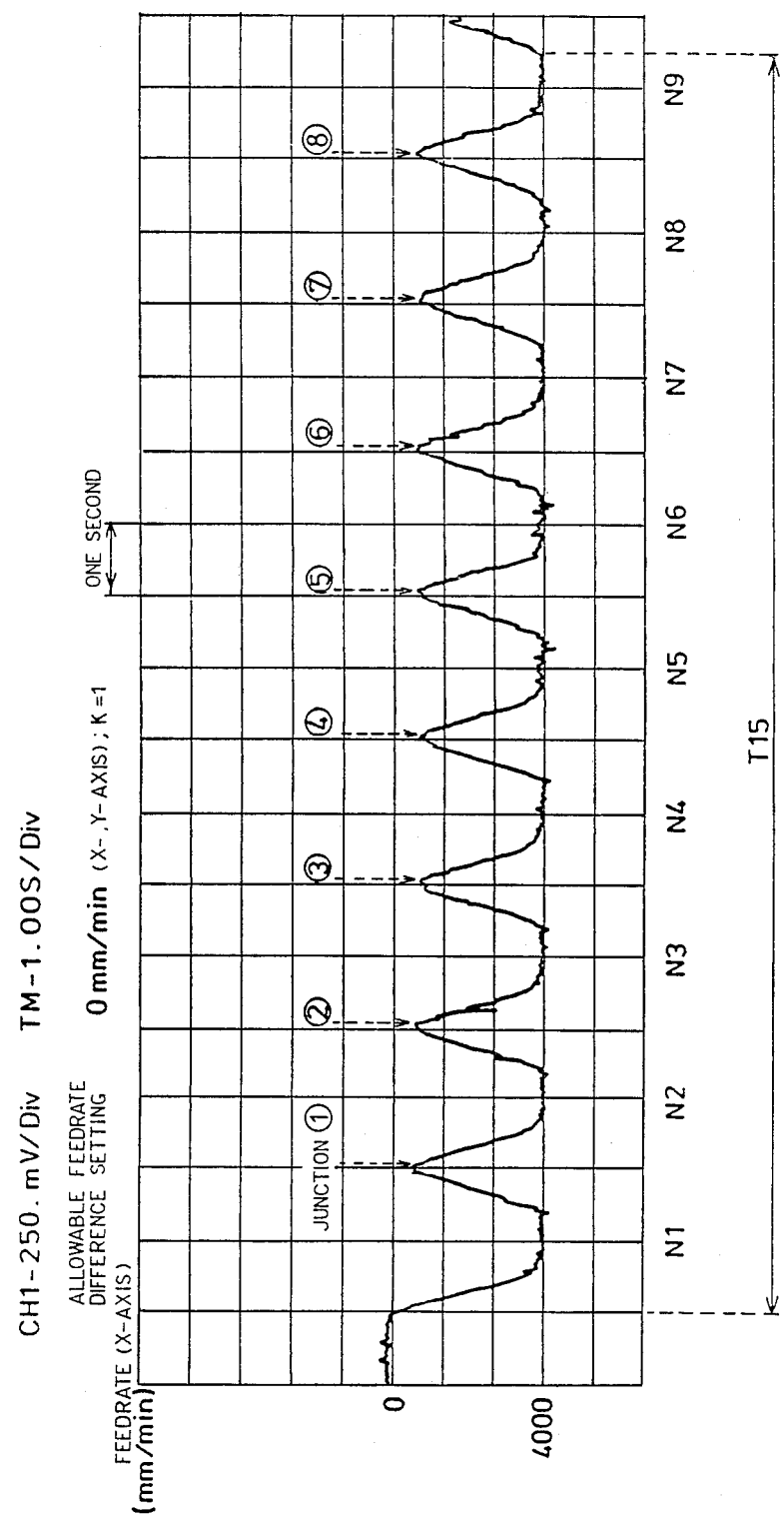

In FIG. 15, the allowable feedrate difference setting is selected to be 0 mm/min. Since the feedrate difference between adjacent blocks is not zero for the Y-axis, it exceeds the allowable feedrate difference setting. Accordingly, the feedrate along the combined axis is controlled to fall to zero at each block junction because of the deceleration 0 for the Y-axis. At each of the junctions ① through ⑧ in FIG. 15, the interpolated commands represent the feedrate 0 for the X-axis, but the actual X-axis feedrate waveform is slightly higher than the zero level due to a response delay of the motor. The time T15 required to run from the block N1 to N9 is about 17.5 seconds.

Figure 16:
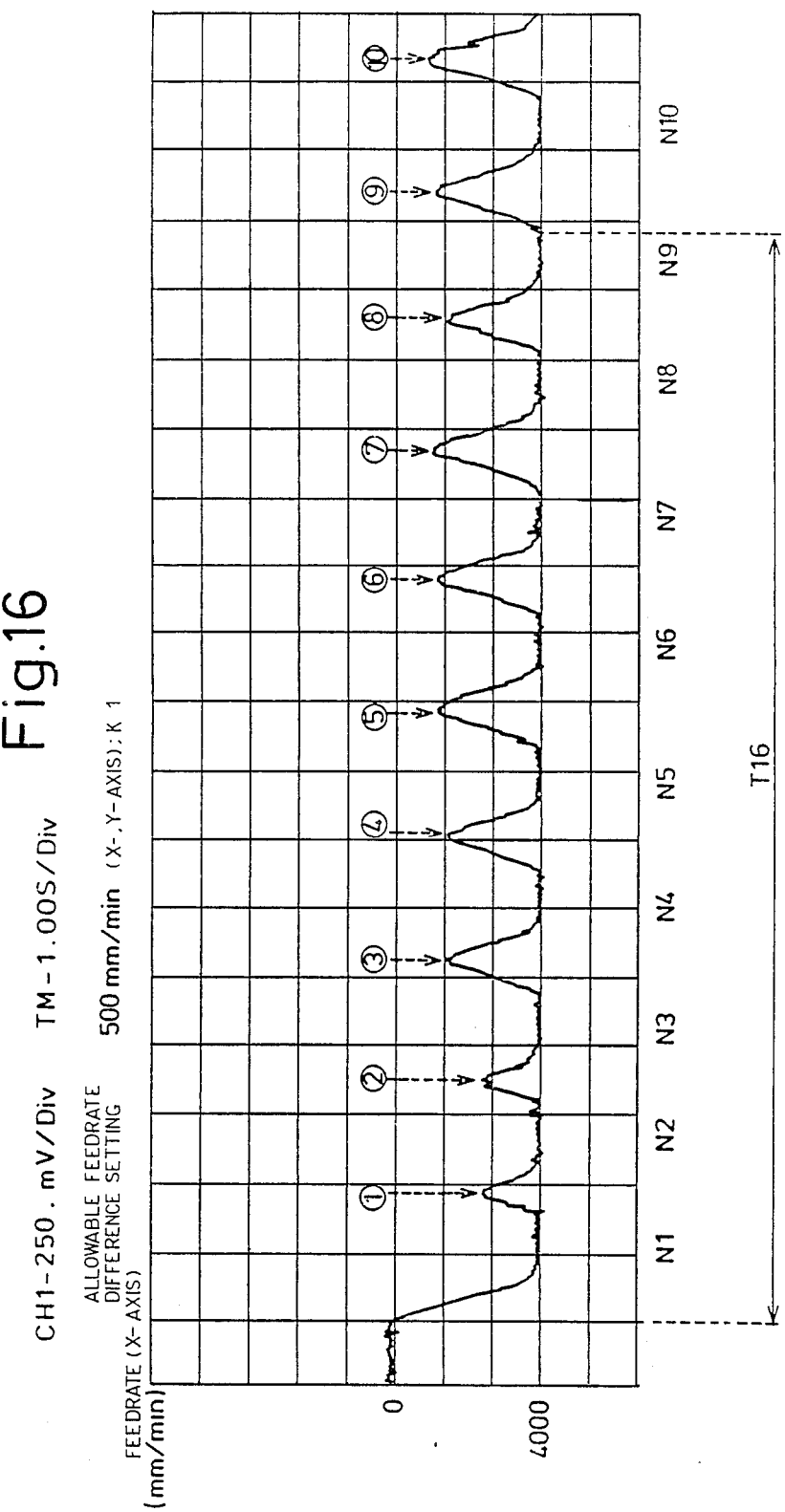

The allowable feedrate difference setting in FIG. 16 is selected to be $V_{LY}=500$ mm/min. The motion commands given are as shown in FIG. 14. In FIG. 16, the interpolated commanded feedrate does not fall to the zero level as shown at the junctions ① and ② for the reason that the absolute feedrate difference between the blocks N1 and N2 for the Y-axis is 1000 mm/min. which is larger than $V_{LY}=500$ mm/min. The deceleration for the Y-axis is 500/1000=0.5, and the feedrate for the X-axis is not changed. The interpolated feedrate for the combined axis is lowered down to 0.5 at the block-to-block junctions due to the Y-axis deceleration of 0.5. Therefore, the X-axis feedrate 4000 mm/min. is lowered to 2000 mm/min. at the junction ①. Actually, however, the plotted feedrate is higher than 2000 mm/min. since the motor has a response delay. For the same reason, the X-axis feedrate at the junction 2 is reduced to 2000 mm/min. (interpolated output) under the influence of the feedrate difference for the Y-axis.

The command feedrate difference at the junction ③ is 5000 mm/min. as shown in FIG. 14. The Y-axis deceleration is therefore 500/(5000×K)=0.1, and the X-axis feedrate 4000 mm/min. is lowered to 4000×0.1=400 at the junction ③. Although the actual feedrate is not reduced down to 400 due to the motor response delay, the difference between the feedrates at the junction ③ and the junctions ①, ② is clear in FIG. 16. The feedrates at the other junctions ④ through ⑩ are controlled in the similar manner.

The time T16 required to run from the block N1 to N9 is about 16 seconds which is shorter than the time T15 in FIG. 15. This is because the interpolated feedrate (on the condition that the acceleration is constant) does not fall to zero.

FIG. 17 shows a feedrate waveform of the X-axis motor driven by the commands when the allowable feedrate difference settings $V_{LX}$ and $V_{LY}$ are selected to be 1000 mm/min. In FIG. 17, feedrate changes at the junctions between the blocks N1 and N2 and also between the blocks N2 and N3 are eliminated. More specifically, since the absolute feedrate differences for the Y-axis between these blocks are 1000 mm/min. as shown in FIG. 14, the deceleration (allowable feedrate difference/feedrate difference×K)=1000/1000=1.0 (=100%). Thus, the answer to the decision step 4 in the flowchart of FIG. 7A is NO, and the deceleration step 7 is bypassed. Stated otherwise, the feedrate difference 1000 mm/min. for the Y-axis between the blocks N1 and N2 and between the blocks N2 and N3 does not exceed the allowable feedrate difference setting, it is neglected. The time T17 from the blocks N1 through N17 is about 14.7 seconds.

In FIG. 18, the allowable feedrate difference settings $V_{LX}$ and $V_{LY}$ are selected to be 9999 mm/min. All of the Y-axis feedrate differences in FIG. 14 are smaller than 9999 mm/min., and the deceleration for the Y-axis is greater than 1. Therefore, no deceleration is effected at each block-to-block junction with respect to the Y-axis feedrate difference. The feedrate waveform of the X-axis motor is flat at about 4000 mm/min. The time required to run through the blocks is shorter than the T17 of FIG. 17 though it is not shown because the blocks are not clearly defined in FIG. 18.

Some modifications of the present invention will be described below.

It is not necessary for the parameter setting unit 72B in FIG. 5 to enter allowable feedrate difference settings for all of the control axes of the machine tool 10. Instead, only one control axis (preferably a control axis which is subject to a very large feedrate change) may be selected to be controlled by such an allowable feedrate difference setting. According to this modification, the deceleration Q for the single control axis is calculated in the deceleration calculating unit 56 in FIG. 4. If $Q<1$, the deceleration Q ($<1$) may be used as the smallest deceleration Qi.

Rather than selecting a single control axis to be controlled, a plurality of control axes (but not all control axes) may be selected to be controlled.

While the allowable feedrate difference settings have been described as being given as parameters, they may be given beforehand as constants if a machine tool to be controlled can be identified.

Since the allowable feedrate difference settings can be given as parameters in the illustrated embodiment, largest allowable feedrate difference settings for the respective control axes may be entered. Although the machine tool which is numerically controlled by the numerical control apparatus is particularly shown as a cutting machine tool, the present invention is not limited to the control of such a cutting machine tool, but is also applicable to the control of a laser machine tool, for example. Insofar as a machine tool can be operated for machining a workpiece to desired contour under motion commands from a numerical control apparatus irrespectively of whether the machine tool employs a cutting tool or a laser beam, the principles of the present invention can be employed to control such a machine tool.

Although a certain preferred embodiment has been shown and described, it should be understood that many changes and modifications may be made therein without departing from the scop of the appended claims.

What is claimed is:

1. A method of controlling a numerical control apparatus having a plurality of control axes to effect machining operation on a workpiece under a machining program, said method comprising the steps of:
    establishing an allowable feedrate difference setting for at least one selected control axis;
    calculating a feedrate difference for said selected control axis from command data in successive blocks in the machining program for said selected control axis;
    calculating a deceleration for said selected control axis from said allowable feedrate difference setting and said calculated feedrate difference; and holding said feedrate difference within said allowable feedrate difference setting at a block-to-block junction based on said calculated deceleration.

2. A numerical control apparatus for machining a workpiece under a machining program, comprising:
means for establishing an allowable feedrate difference setting for a control axis of the numerical control apparatus;
means for calculating a feedrate difference for said control axis from command data in successive blocks in the machining program for said control axis;
means for calculating a deceleration for said control axis from said allowable feedrate difference setting and said calculated feedrate difference; and
means for calculating a point to start deceleration in a present block from said calculated deceleration, whereby said feedrate difference will be held within said allowable feedrate difference setting at a block-to-block junction based on said calculated deceleration.

3. A numerical control apparatus according to claim 2, wherein said machine tool has a plurality of control axes, said establishing means including means for establishing a plurality of allowable feedrate difference settings for said control axes, respectively.

4. A numerical control apparatus according to claim 3, wherein said deceleration calculating means includes means for calculating a plurality of decelerations for said control axes, respectively, and for specifying one of the calculated decelerations.

5. A numerical control apparatus according to claim 4, wherein said deceleration calculating means includes means for calculating the deceleration for each of said control axes from the present block to the following block based on a commanded feedrate stored in the block for each control axis, a present feedrate corresponding to the block for each control axis, and the established block-to-block feedrate difference setting for each control axis.

6. A numerical control apparatus according to claim 4, including means for selecting the smallest one of said calculated decelerations.

7. A numerical control apparatus according to claim 4, wherein said means for calculating a point to start deceleration comprises an interpolator for issuing a product of the smallest one of said decelerations supplied from said deceleration calculating means and the feedrate of an object controlled by the numerical control apparatus as a feedrate command signal.

8. A numerical control apparatus according to claim 7, wherein said interpolator includes means for calculating a point to start deceleration in the present block and for calculating initial and final feedrates upon deceleration.

9. A numerical control apparatus according to claim 4, wherein said means for calculating a point to start deceleration comprises an interpolator, said point to start deceleration being determined by a product of the present feedrate for each of said control axes and the feedrate difference which most deviates from the allowable feedrate difference setting for each control axis between the present block and the following block.

10. A numerical control apparatus according to claim 4, wherein said establishing means includes means for establishing the allowable feedrate difference setting for one of said control axes which is subject to a larger feedrate change than the other control axes.

11. A numerical control apparatus according to claim 10, wherein each of said allowable feedrate difference settings is selected and entered beforehand as a constant.

12. A numerical control apparatus according to claim 2, wherein said deceleration calculating means includes means for calculating as said deceleration a ratio of said allowable feedrate difference setting to the feedrate difference between the blocks.

13. A numerical control apparatus according to claim 12, including means for excluding said calculated deceleration from control data for said control axis when said calculated deceleration is at least 1.

14. A numerical control apparatus according to claim 2, wherein said deceleration calculating means includes means for calculating as said deceleration a ratio of said allowable feedrate difference setting to an actual commanded feedrate difference produced by multiplying the feedrate difference between the blocks by an override percent.

15. A numerical control apparatus according to claim 2, wherein said apparatus is used in combination with a cutting machine tool.

* * * * *